United States Patent [19]

Morheng

[11] 3,937,606
[45] Feb. 10, 1976

[54] MOLD FOR FORMING TIRES
[75] Inventor: Marcel J. Morheng, Bertrange, Luxemburg
[73] Assignee: The Goodyear Tire & Rubber Company, Akron, Ohio
[22] Filed: June 3, 1971
[21] Appl. No.: 149,491

[52] U.S. Cl. ............................................. 425/28 D
[51] Int. Cl.² ......................................... B29H 5/02
[58] Field of Search ......... 425/28 D, 28, 35, 31, 36, 425/46

[56] References Cited
UNITED STATES PATENTS

| | | | |
|---|---|---|---|
| 2,732,589 | 1/1956 | Steadman | 425/310 X |
| 2,736,924 | 3/1956 | Bean | 425/28 D |
| 2,813,304 | 11/1957 | Hawkinson | 425/46 |
| 2,848,744 | 8/1958 | Crooker | 425/28 D |
| 3,283,053 | 11/1966 | Felker | 425/46 X |
| 3,328,849 | 7/1967 | Kunz et al. | 425/28 D |
| 3,432,888 | 3/1969 | Brierley | 425/28 D |
| 3,546,749 | 12/1970 | Wissel | 425/35 |
| 3,553,790 | 1/1971 | Brobeck et al. | 425/35 |
| 3,608,602 | 9/1971 | Youngblood | 425/28 D |

Primary Examiner—J. Howard Flint, Jr.
Attorney, Agent, or Firm—F. W. Brunner; H. E. Hummer

[57] ABSTRACT

A mold provided with specially configured blades for forming correspondingly configured recesses in ribs shaped in the tire tread by a number of grooves which generally extend in a circumferential direction about the tire.

2 Claims, 3 Drawing Figures

MOLD FOR FORMING TIRES

BACKGROUND OF THE INVENTION

A pneumatic tire is molded and vulcanized in a mold generally having two opposed sections for shaping the tire. Each section has an annular ring or matrix which is separately produced, for example, by casting. The tread rings each have a geometric pattern of configured ridges extending from the normally smooth inner periphery of the ring, for molding in the tire tread a correspondingly configured pattern of slots which improve the traction characteristics of the tire, especially on rain-covered roadways where the slots act as channels through which the water can escape from the tread as it contacts the roadway.

It is desirable to cast the ridges with the tread ring. Many times this is not possible because of the small size of some of the slots. Ridges cast too small are susceptible to breakage which is detrimental to the mold. Therefore, such ridges are separately machined from material which is preferably stronger and more durable than material used in casting the tread ring. The small separate ridges fastened to the mold are called blades or blading, and shape the smaller slots or recesses generally molded in the tread ribs projecting from between the larger slots or grooves molded in the tread by the ridges or projections integrally cast with the tread ring.

Most blades have an even thickness throughout their length and provide a correspondingly configured recess having a uniform width. For example, U.S. Pat. No. 3,553,790 shows and describes a typical blade which may be provided with air vents or passageways for allowing the escapement of gases during the vulcanization of a tire. However, even in this case, the blades are designed to produce configured recesses having a uniform width, since the V-shaped grooves used as air vents are purposely made sufficiently small to prevent rubber from flowing into the air vents and clogging them during the vulcanization process.

A pair of sharp edges are formed on the opposing sides of each recess and grip the roadway to increase the traction characteristics of the tire. However, these uniformly shaped recesses are susceptible to closing as they move into contact with the roadway because of the deflection or flexing characteristics of the tire as it engages the roadway. It is desirable that these recesses remain at least partially open to prevent a serious reduction of the traction characteristics of the tire. The invention is directed to providing a highly improved blade for molding a recess having a non-uniform cross-sectional width throughout its length, thereby increasing the probability that at least a portion of the recess will remain open as the tire contacts the roadway.

Briefly stated, the invention is in a mold in which tires are molded and vulcanized. The mold comprises a tread ring including configured projections which are integrally cast in, and extend from, the ring for forming correspondingly configured grooves in the tread of a tire placed in the mold and vulcanized. A plurality of blades are separately shaped apart from the ring and fastened to the ring during the process for forming the finished ring, including the projections and blades. Each of the blades has a varying thickness and a configuration and size sufficient to produce a correspondingly configured recess in the tread of a vulcanized tire, such that a portion of the recess having a larger width will be at least partially open when a portion of the recess having a smaller width, closes.

DESCRIPTION OF THE DRAWING

The following description of the invention will be better understood by having reference to the annexed drawing, wherein.

DESCRIPTION OF THE INVENTION

Figure 1:
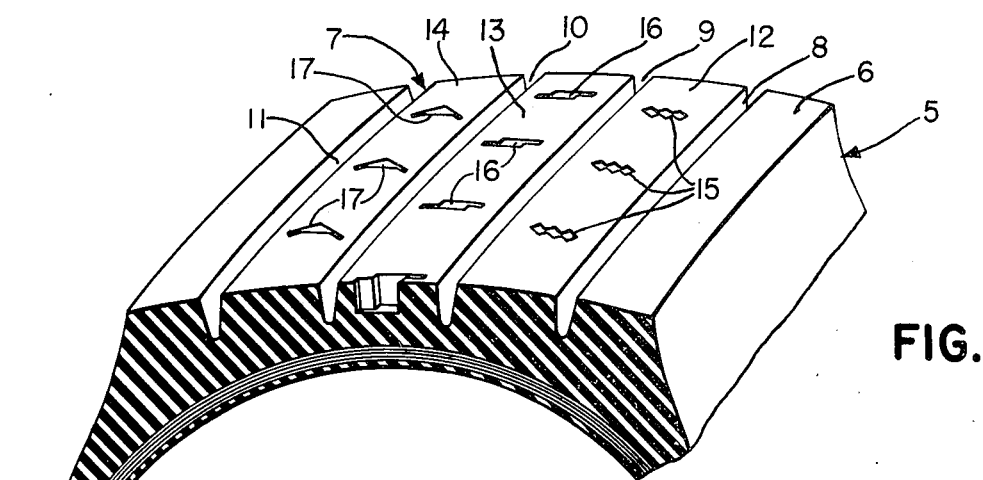
FIG. 1 is a perspective view of a portion of a tire tread pattern produced by a mold made in accordance with the invention.
Figure 2:
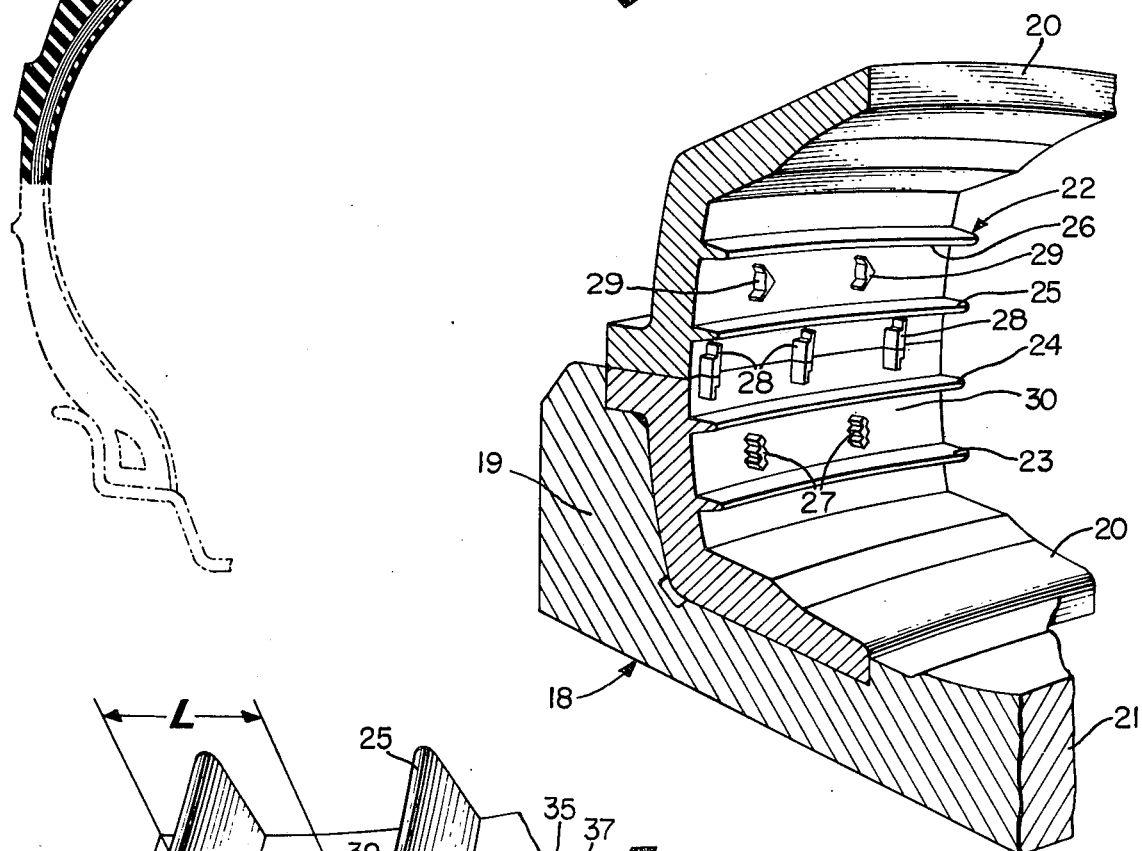
FIG. 2 is a perspective view of a portion of a mold made in accordance with the invention.

Referring generally to the drawing, there is shown a pneumatic tire 5 comprising a tread 6 in which is molded a geometric pattern 7 of specially configured slots for increasing the traction of the tire 5, especially on rain-covered roadways. A number of larger slots or grooves 8, 9, 10, and 11 are molded in the tread 6 and preferably extend in a circumferential direction around the tire 5, dividing the tread 6 into a series of ribs 12, 13, and 14, which project from between the grooves 8–11.

A plurality of smaller slots or recesses 15, 16, and 17 are also molded in the tire tread 6. The recesses 15–17 are usually disposed in the ribs 12-14 intermediate the grooves 8–11, and preferably extend in a direction which is angularly disposed to a plane containing the mid-circumferential centerline of the tire tread 6, such plane hereinafter referred to as the centerplane. The grooves 8–11, on the other hand, are normally in planes parallel to the centerplane.

The tire 5 is molded and vulcanized in a mold 18 including a pair of opposing sections, e.g. section 19, which are usually similar in design and produced, for example, by casting from any suitable material e.g. aluminum. The mold sections 19 each comprise a tread ring or matrix 20, which is cast separate and apart from the remaining mold portion 21 used for shaping the sidewalls of the tire 5. The tread rings 20 are fastened by bolts to the side portions 21. The tread rings 20 each comprise a geometric pattern 22 of configured ridges corresponding to the pattern 7 of slots molded in the tire 5.

A number of larger ridges or projections 23, 24, 25, and 26 are integrally cast with each of the tread rings 20 and form the larger slots or grooves 8–11. A series of smaller ridges or blades 27, 28, and 29 are separately machined from any suitable material, e.g. steel, and attached to each of the tread rings 20 during the casting process. The blades 27-29 shape the smaller slots or recesses 15–17 in the tire tread 6. The larger projections 23–26 and smaller blades 27–29 extend inwardly from the normally smooth inner periphery 30 of each of the tread rings 20.

As previously indicated, the blades 27–29 are composed of material which is preferably stronger and more durable than the material used in casting the tread rings 20. The size of the tire being molded is determinative of whether a ridge is cast or separately made and attached to the tread rings 20. For example, in the case of passenger tires, the blades 27–29, at their narrowest cross-section, may have a maximum thickness of about 0.03 inches, whereas in larger truck tires the maximum thickness at the narrowest cross-section could be 0.06 inches. In any case, the blades 27–29 are separately machined and not integrally formed with the tread rings, such being the case even when the tread rings are machined. The blades 27–29 may be positioned in abutting relation with the adjacent projections 23–26, or may be spaced from the projections depending on the geometric pattern of grooves and recesses desired in the finished tread 6.

Figure 3:
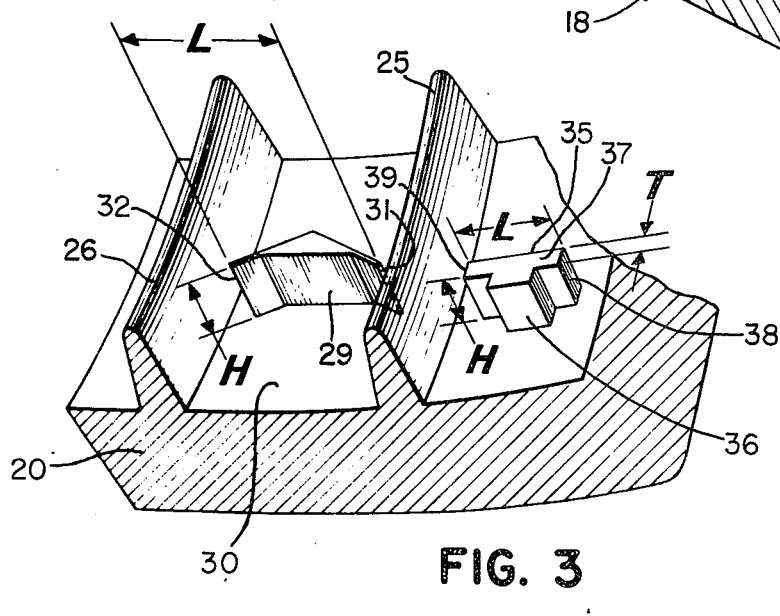
FIG. 3 is a detailed view of the mold showing blades having a non-uniform cross-sectional thickness

The blades 27–29 and correspondingly formed recesses 15–17, are usually similar in design for any given tire. The recesses 15–17 (FIG. 1) were purposely given different configurations to illustrate various types of blading which can be used in the tread rings 20. In any case, the blades 27–29, as shown by the differently configured recesses 15–17, each have a cross-sectional thickness which may vary uniformly or sporadically throughout their overall length L (FIG. 3). The blades 27–29 preferably have a cross-sectional thickness which is smaller at opposing extremities or ends 31 and 32 of the blades than intermediate the ends 31 and 32. The blades 27–29, as shown by the recess 15, can have a configuration which is symmetrical about its longitudinal axis and formed from alternate portions with reduced and enlarged cross-sectional thickness.

In all cases, the recesses, projections, and offsets forming the configuration of the blades 27–29 are of a shape and size sufficient to displace rubber in the tread 6 during vulcanization of the tire 5, and consequently mold in the tread 6, recesses 15–17 having a non-uniform width corresponding to the varying thickness of the blades 27–29. The configured recesses 15–17 have portions with larger cross-sectional widths which remain at least partially open when other portions with smaller cross-sectional widths are closed, thereby providing some traction elements for gripping the roadway. The logitudinal cross-sectional configuration of each of the blades 27–29 is uniform throughout the height H that the blade extends from the inner periphery 30 of each of the tread rings 20.

A specially configured blade 35 (FIG. 3), embodying the invention, may include a bulbous portion or projection 36 extending from a blade portion 37 having a generally uniform thickness T throughout its length L. The projection 36 protrudes from the blade portion 37 intermediate opposing ends 38 and 39 of the blade portion 37, and acts to break up or disrupt the longitudinal uniformity of the blade 35. The blades 27–29 and 35 preferably have outer exposed surfaces which are flat and free from any vents or passageways for allowing escapement of gas during the vulcanization process, such vents being formed, for example, by V-shaped grooves which are at least coextensive with the height H that the blade 35 extends from the smooth periphery 30 of each of the rings 20.

It is desirable to make any blade portion, in which the thickness varies, at least 25 percent of the overall length of the blade. Moreover, the thickness of any such portion should vary by at least 30 percent, and it is preferable that the maximum thickness of the portion be at least twice its minimum thickness.

Thus, there has been provided a tire mold having blades which are different from conventional blades having generally uniform thickness throughout their length. The blades of the invention are uneven and not uniform such that a portion of the recess formed by the blade will remain open when another portion of the recess is closed.

What is claimed is:

1. A mold in which tires are molded and vulcanized, comprising:
   a. a tread ring, including configured projections integrally cast in the ring for forming correspondingly configured grooves in the tread of a tire being molded and vulcanized in the mold; and
   b. a plurality of blades separately shaped apart from the ring and fastened to the ring during the process for forming the finished ring including the projections and blades, each of the blades having a uniform cross-section throughout its height measured from the ring, a non-uniform cross-section throughout the length thereof, and a shape and size sufficient to produce a correspondingly shaped recess in the tread of a vulcanized tire, each of the plurality of blades having opposing extremities which are smaller, in thickness, than a portion of the blade intermediate the extremities.

2. A mold in which tires are molded and vulcanized, comprising:
   a. a tread ring, including configured projections integrally cast in the ring for forming correspondingly configured grooves in the tread of a tire being molded and vulcanized in the mold; and
   b. a plurality of blades separately shaped apart from the ring and fastened to the ring during the process for forming the finished ring including the projections and blades, each of the blades having a uniform cross-section througout its height measured from the ring, a non-uniform cross-section throughout the length thereof, and a shape and size sufficient to produce a correspondingly shaped recess in the tread of a vulcanized tire, each of the plurality of blades having alternate portions with enlarged and reduced thicknesses, and the alternate portions being symmetrical from the longitudinal axis of the blade.

* * * * *